(No Model.)
E. A. BALDWIN.
DRIVE CHAIN.
No. 523,877. Patented July 31, 1894.
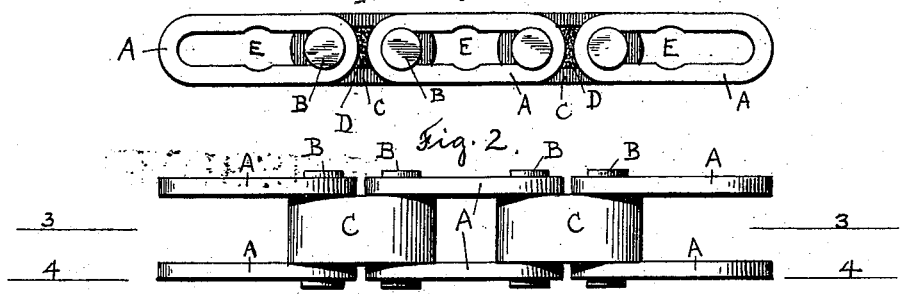
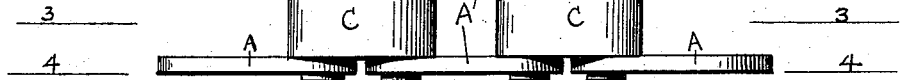
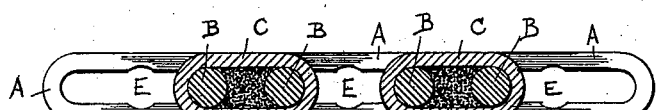
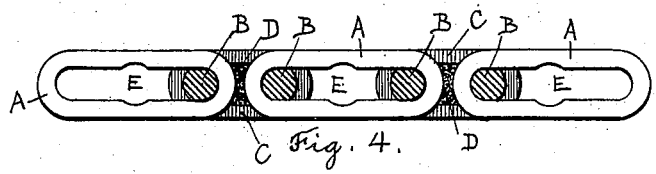
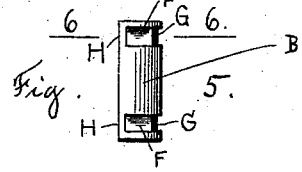
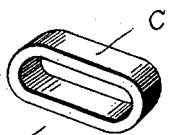
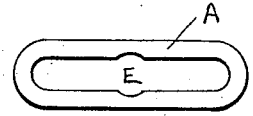
Witnesses
Chas. F. Schmelz
John T. Knowlton
Inventor.
Ellory A. Baldwin
By his Attorney
Chas. S. Forbes
THE NORRIS PETERS CO., PHOTO-LITHO., WASHINGTON, D. C.

UNITED STATES PATENT OFFICE.

ELLORY A. BALDWIN, OF UPTON, MASSACHUSETTS.

DRIVE-CHAIN.

SPECIFICATION forming part of Letters Patent No. 523,877, dated July 31, 1894.

Application filed November 7, 1892. Serial No. 451,245. (No model.)

*To all whom it may concern:*

Be it known that I, ELLORY A. BALDWIN, a citizen of the United States, residing at Upton, in the county of Worcester and State of Massachusetts, have invented a new and useful Improvement in Bicycle or Parallel - Link Chains, of which the following is a specification.

My improvement relates to parallel-link chains which operate in conjunction with sprocket wheels, and the objects of my improvement, are, first, to provide facilities for taking up the slack of the chain arising from wear; second, to provide a quick and simple method of attaching and detaching the several parts of the chain to and from each other so that the first object may be readily attained; and, third, to provide a method by which the bearings may be rendered noiseless and dustproof. I attain these objects by the mechanism illustrated in the accompanying drawings, in which—

Figure 1. represents a side view of my improved chain. Fig. 2. is a top view of the same. Fig. 3. shows a longitudinal section on line 3—3— (Fig. 2). Fig. 4. is a similar section of line 4—4 (Fig. 2). Fig. 5. is a detailed view of the barrel stud. Fig. 6. is a section on line 6—6 (Fig. 5). Fig. 7. is a perspective view of the central strap, and Fig. 8. is a detail of one of the side links.

Similar letters refer to similar parts throughout the several views.

A. is the slotted parallel-link.

B. is the barrel stud connecting parallel-links to each other.

C. C. are the central straps made from tubing flattened and hardened packed with felt D. or other substance capable of excluding dust and furnishing a noiseless and dust proof bearing.

E. is an enlargement of the slot in each parallel link sufficiently large to allow of the removal of the link over the head of the barrel stud in order that the stud may be taken out and turned half way over; the object and necessity of this reversal of the stud arises from the fact that as the chain wears it lengthens and thus loosens and rattles; the manner in which my invention provides for retightening the chain and taking up this slack is seen by reference to Fig. 5, in which F. F. are flat slots in which fit the edges of the parallel-link A. sufficiently close to prevent the barrel studs B. from turning while in use.

G. G. are rounded slots about a thirty second of an inch in depth to receive the inner end of the parallel-link A. when the chain is first used and before slackened by wear.

When by use the chain has become slack one or any number of the barrel studs B. may be turned half way over so that the unslotted slides H. H. may bear on the inner edge of the parallel-link A. Each barrel-stud thus turned shortens the chain the depth of the slot G. and tightens it to that extent.

I am aware that prior to my invention parallel-link chains have been made and I do not claim their invention broadly; but What I do claim as my invention, and desire to secure by Letters Patent, is—

The combination in a parallel-link chain of the slotted links A, having the slot enlarged at E., with the reversible barrel studs B; having slots F. F. and G. G. and the central straps C all substantially as set forth.

ELLORY A. BALDWIN.

Witnesses:
EDWARD J. MELANEFY,
CHAS. S. FORBES.